(12) United States Patent
Lynch (10) Patent No.: US 7,875,213 B2
(45) Date of Patent: Jan. 25, 2011

(54) MINERAL DISPERSANTS AND METHODS FOR PREPARING MINERAL SLURRIES USING THE SAME

(75) Inventor: Thomas J. Lynch, Roswell, GA (US)

(73) Assignee: Kemira Oyj (FI)

( * ) Notice: Subject to any disclaimer, the term of this patent is extended or adjusted under 35 U.S.C. 154(b) by 0 days.

(21) Appl. No.: 12/172,536

(22) Filed: Jul. 14, 2008

(65) Prior Publication Data

US 2009/0014695 A1    Jan. 15, 2009

Related U.S. Application Data

(60) Provisional application No. 60/949,569, filed on Jul. 13, 2007.

(51) Int. Cl.
*H01B 1/12* (2006.01)
(52) U.S. Cl. .............. 252/519.33; 252/518.1; 252/519.3; 252/181; 106/416; 106/465; 106/795; 526/213; 526/217; 526/222; 526/317.1
(58) Field of Classification Search .......... 252/181, 252/521.5, 518.1, 519.3, 519.33; 106/416, 106/465, 795; 162/164.3; 501/148; 524/447; 525/328.2; 526/217, 213, 222, 317.1
See application file for complete search history.

(56) References Cited

U.S. PATENT DOCUMENTS

| 4,503,172 A | | 3/1985 | Farrar et al. | |
|---|---|---|---|---|
| 4,554,298 A | | 11/1985 | Farrar et al. | |
| 4,610,801 A | * | 9/1986 | Matthews et al. | ............ 252/181 |
| 4,812,427 A | * | 3/1989 | Kohut | ......................... 501/148 |
| 4,842,651 A | | 6/1989 | Ravet et al. | |
| 5,244,542 A | * | 9/1993 | Bown et al. | .............. 162/164.3 |

(Continued)

FOREIGN PATENT DOCUMENTS

GB    1414964    11/1975

(Continued)

OTHER PUBLICATIONS

Loiseau et al., "Synthesis and Characterization of Poly(acrylic acid) Production by RAFT Polymerization. Application as a Very Efficient Dispersant of CaCo3, Kaolin, and TiO2", Macromolecules 2003, Apr. 2003, 36, 3066-3077.*

(Continued)

*Primary Examiner*—Mark Kopec
*Assistant Examiner*—Khanh Tuan Nguyen
(74) *Attorney, Agent, or Firm*—Cantor Colburn LLP (57) ABSTRACT

A mineral slurry comprises mineral particles in an amount equal to or greater than about 60 percent by total weight of the slurry, wherein 85 percent of the mineral particles have an average particle size equal to or less than 2 micrometers; a polyelectrolyte dispersant derived from an acrylate polymer formed by reversible addition-fragmentation chain transfer polymerization, wherein the polyelectrolyte dispersant comprises endgroups comprising thio-containing residues derived from a trithiocarbonate chain transfer agent, wherein the polyelectrolyte dispersant is in an amount less than about 35 pounds of the dispersant per ton of dry mineral particles, and wherein the polyelectrolyte dispersant has a molecular weight of 3000 to 10,000 Daltons and a polydispersity of at least 1.0 and less than 1.5; and the remainder water.

19 Claims, 8 Drawing Sheets

U.S. PATENT DOCUMENTS

| | | | |
|---|---|---|---|
| 5,676,747 A * | 10/1997 | Brown | 106/465 |
| 5,743,952 A * | 4/1998 | Skuse et al. | 106/416 |
| 6,153,705 A | 11/2000 | Corpart et al. | |
| 6,512,081 B1 | 1/2003 | Rizzardo et al. | |
| 6,596,899 B1 | 7/2003 | Lai | |
| 6,682,775 B2 | 1/2004 | Calhoun et al. | |
| 6,855,840 B2 | 2/2005 | McCormick et al. | |
| 7,012,119 B2 | 3/2006 | Charmot et al. | |
| 7,345,121 B2 | 3/2008 | Suau et al. | |
| 2002/0010249 A1 * | 1/2002 | Bilimoria | 524/447 |
| 2003/0121457 A1 * | 7/2003 | Butters | 106/795 |
| 2004/0054063 A1 | 3/2004 | Brown et al. | |
| 2004/0097674 A1 | 5/2004 | Suau et al. | |
| 2005/0267274 A1 | 12/2005 | Lai | |
| 2006/0198422 A1 | 9/2006 | Chopra et al. | |
| 2007/0179262 A1 * | 8/2007 | Suau et al. | 526/217 |
| 2007/0197747 A1 * | 8/2007 | Suau et al. | 526/213 |
| 2007/0225447 A1 * | 9/2007 | Farnham et al. | 525/328.2 |
| 2009/0014695 A1 * | 1/2009 | Lynch | 252/521.5 |

FOREIGN PATENT DOCUMENTS

| | | |
|---|---|---|
| WO | WO9801478 | 1/1998 |
| WO | WO9931144 | 6/1999 |
| WO | WO2004037780 A1 | 5/2004 |

OTHER PUBLICATIONS

Ladaviere et al., "Controlled Radical Polymerization of Acrylic Acid in Protic Media", Macromolecules 2001, Jun. 2001, 34, 5370-5372.*

Ran Wang, Charles L. McCormick, Andrew B. Lowe, "Synthesis and Evaluation of New Dicarboxylic Acid Functional Trithiocarbonates: RAFT Synthesis of Telechelic Poly(n-butyl) acrylate)s," Macromolecules, vol. 38, No. 23, 2005 American Chemical Society, pp. 9518-9525.

Marie-France Llauro, Julien Loiseau, Fernande Boisson, Frederic Delolme, Catherine Ladaviere, J. Claverie, "Unexpected End-Groups of Poly(acrylic Acid) Prepared by RAFT Polymerization," Journal of Polymer Science: Part A: Polymer Chemistry, vol. 42, pp. 5439-5462 (2004).

International Search Reported mailed Oct. 3, 2008, 9 pages.

* cited by examiner

MINERAL DISPERSANTS AND METHODS FOR PREPARING MINERAL SLURRIES USING THE SAME

CROSS REFERENCE TO RELATED APPLICATIONS

This application claims the benefit of and priority to U.S. Provisional Application No. 60/949,569, filed Jul. 13, 2007 and entitled, "MINERAL DISPERSANTS AND METHODS FOR PREPARING MINERAL SLURRIES USING THE SAME", which is entirely incorporated herein by reference.

BACKGROUND

The present disclosure generally relates to slurries containing water, mineral particles, and a dispersant, as well as to methods for the preparation thereof.

Mineral fillers are relatively cheap substances which are, for example, added to materials, paints, paper, plastics, and the like, to increase the volume and/or weight but often also to improve the technical usability thereof. For example, calcium carbonate consists of naturally occurring materials and is often used in the pulp and paper industry. These naturally occurring minerals include, for example, limestone, marble, chalk, as well as shells of marine or coastal organisms, such as oyster shells.

Generally, mineral fillers have to be ground into particles to make them useful for the various possible applications. For example, calcium carbonate is generally prepared by first obtaining carbonate-containing raw materials by opencast or, underground quarrying. The quarried carbonate-containing raw materials together with inorganic or organic contaminations, which depend on the area of mining, are purified and then subjected to dry and/or wet processing. A preliminary comminution is performed by milling and, if necessary, subsequent flotation. Such starting materials are then subjected to further wet grinding at a solids content of 30-75% by weight using agitator-ball mills.

Milling can be done with or without media. In media milling, balls, pebbles or other media such as sand are used to grind the mineral particles to a desired particle size. Common methods of media milling are ball milling, attrition milling, sand milling, vertical and horizontal milling. In each case, media that are typically larger than the desired particle size to be ground are placed in a chamber, which is subsequently shaken, stirred, or otherwise agitated. By choosing the correct media material, particles can be milled down to average particle sizes of less than 1 micrometer.

Horizontal and vertical mills consist of circular containers oriented as labeled, in which disks or paddles, rotating at high speed impart intense impact and shear to comminute the mineral slurry particles. Horizontal mills incur higher installation costs and are more complex than vertical mills though horizontal mills are more energy efficient. Both mill types are energy intensive, however, and thus there exists a need for improved mineral grinding efficiency.

The major physical characteristics of mineral fillers for pulp and paper applications, for example, are median particle size, the distribution of particle size, brightness, and rheology in water at high solids. Unfortunately, higher solids content and increased particle fineness are properties which both increase the slurry viscosity. Current dispersants fail to provide stable slurries with high solids, low fines, and relatively low viscosity.

Accordingly, there exist needs for both improved grinding aids that increase milling efficiencies and for improved dispersants for mineral slurries.

BRIEF SUMMARY

Disclosed herein are polyelectrolytes that perform as improved grinding aids and improved dispersants for mineral grinding and slurry viscosity stability. 'Dispersant' is used throughout to include polyelectrolytes with both dispersing and grinding aid properties.

In one embodiment, a mineral slurry comprises mineral particles in an amount equal to or greater than about 60 percent by total weight of the slurry, wherein 85 percent of the mineral particles have an average particle size equal to or less than 2 micrometers; a polyelectrolyte dispersant derived from an acrylate polymer formed by reversible addition-fragmentation chain transfer polymerization, wherein the polyelectrolyte dispersant comprises endgroups comprising thio-containing residues derived from a trithiocarbonate chain transfer agent, wherein the polyelectrolyte dispersant is in an amount less than about 35 pounds of the dispersant per ton of dry mineral particles, and wherein the polyelectrolyte dispersant has a molecular weight of 3000 to 10,000 Daltons and a polydispersity of at least 1.0 and less than 1.5; and the remainder water.

In one embodiment, a process for preparing a mineral slurry is disclosed, the process comprising: milling a mixture with a milling media to form the mineral slurry, the mixture comprising carbonate-containing particles in an amount of about 68 to about 80 weight percent based on the total weight of the mixture, a polyelectrolyte dispersant derived from an acrylate polymer formed by reversible addition-fragmentation chain transfer polymerization, wherein the polyelectrolyte dispersant comprises endgroups comprising thio-containing residues derived from a trithiocarbonate chain transfer agent, the polyelectrolyte dispersant having a molecular weight of 3000 to 10,000 Daltons and a polydispersity of less than 1.5 in an amount of less than about 35 pounds of polyelectrolyte dispersant per ton of dry weight of carbonate-containing particles, and a remainder being water; and filtering the media from the mineral slurry; wherein 90 percent of the carbonate containing particles in the mineral slurry have an average particle size of less than 2 micrometers.

The disclosure may be understood more readily by reference to the following detailed description of the various features of the disclosure and the examples included therein.

BRIEF DESCRIPTION OF THE DRAWINGS

Referring now to the figures wherein the like elements are numbered alike.

DETAILED DESCRIPTION

The present disclosure is directed to mineral dispersants and their use in the preparation of mineral slurries. It has been discovered that the mineral dispersants and processes for making the slurries described herein provide the slurries with a high mineral solids and a stable slurry viscosity over an extended period of time with no of evidence of settling. A particular advantage has been found with its applicability to ground calcium carbonate slurries, wherein solids content of about 75% and a viscosity of less than 1000 centipoise (cP) in water have been obtained. The mineral dispersant provides fast production throughput as measured by the amount of time required to reach target particle size, e.g., 90 percent of particles less than or equal to 2 micrometers, thus providing lower manufacturing costs. Moreover, less replacement water is needed since there is less water evaporation because of lower slurry heating, thus providing improved process control. In this manner, the resulting slurries are stable for railcar shipping, which generally requires the slurry to have stability over a number of days during transport, during transfer from the rail car, and until its end use. The high mineral solids are particularly advantageous because it translates directly to increased product at the customer site per railcar.

Exemplary minerals for use in the slurries include, but are not limited to, kaolin, calcined kaolin, calcium carbonate in various forms (ground, precipitated, marble, limestone, chalk), calcium phosphate, dolomite, calcium sulfate, barium sulfate, titanium oxides, talc, zinc oxide, alumina, magnesium carbonate, magnesium oxide, silica, white carbon, attapulgite, barite, wollastinite, feldspar, gypsum, bentonite, zeolite, sericite, smectite, mica and other mineral pigments.

The mineral dispersant is a polyelectrolyte prepared in a controlled manner, i.e., with predetermined molecular weights, composition, chain end functionality and low polydispersity. As used herein, the term polyelectrolyte refers to a macromolecular substance, which, on dissolving in water or another ionizing solvent, dissociates to give polyions (polycations or polyanions). For example, anionically charged polyelectrolytes have an excess of electrons or electron density and have a net negative charge. The polyelectrolyte can be a polyacid, a polybase, a polysalt or a polyampholyte. In one embodiment, the mineral dispersant is a polyacrylic acid and/or salt having a polydispersity less than 1.5, with a polydispersity less than 1.3 in other embodiments, and a polydispersity less than 1.1 in still other embodiments. As used herein, the term polydispersity refers to the ratio of weight average to number average molecular weight ($M_w/M_n$).

The mineral dispersant can be prepared by a living free radical polymerization process known as reversible addition-fragmentation chain transfer polymerization (RAFT). In addition to a monomer and a free radical initiator, RAFT polymerizations utilize chain transfer agents selected from thiocarbonylthio compounds that are derived from dithioesters, dithiocarbamates, xanthates, dithiophosphinates, or trithiocarbonates. As used herein, the term "polymer" refers to macromolecules formed by the chemical union of five or more combining units called monomers. Also as used herein, the term "copolymer" refers to a polymer comprised of two or more dissimilar monomers, and the term "homopolymer" refers to synthetic or natural polymers formed from a single monomer. The homopolymers or copolymers used as mineral dispersants typically have molecular weights in the range of from about 1,000 to about 10,000, with a preferred molecular weight being from about 2,000 to about 8,000.

For forming polyelectrolyte mineral dispersants, the monomer(s) is not intended to be limited to any particular monomer and includes without limitation, methyl acrylate, ethyl acrylate, butyl acrylate, ethylhexyl acrylate, acrylamide, cyclohexyl acrylate, 2-hydroxyethyl acrylate, 2-hydroxypropyl, 4-hydroxybutyl acrylate, isobornylacrylate, isobutylacrylate, isostearyl acrylate, the corresponding methacrylates such as cyclohexyl methacrylate, diethylaminoethyl methacrylate, dimethylaminoethyl methacrylate, ethyleneglycol dimethacrylate, glycidyl methacrylate, 2-hydroxyethyl methacrylate, 2-hydroxypropyl methacrylate, isobornyl methacrylate, isobutyl methacrylate, methacrylamide, methacrylic acid, methyl methacrylate, lauryl methacrylate, t-butyl methacrylate, and the like. Other monomers will be apparent to those skilled in the art in view of this disclosure. The polyelectrolyte mineral dispersants also include copolymers comprising a combination of the above monomers, and the like.

The source of free radicals can be any suitable method of generating free radicals such as thermally induced homolytic scission of a suitable compound(s) (thermal initiators such as peroxides, peroxyesters, or azo compounds), the spontaneous generation from a monomer (e.g., styrene), redox initiating systems, photochemical initiating systems or high energy radiation such as electron beam, X-ray radiation or gamma-ray radiation. The initiating system is chosen such that under the reaction conditions, there is no substantial adverse interaction of the initiator, the initiating conditions, or the initiating radicals with the transfer agent under the conditions of the procedure. The initiator should also have the requisite solubility in the reaction medium or monomer mixture.

Thermal initiators are chosen to have an appropriate half-life at the temperature of polymerization. These initiators can include one or more of 2,2'-azobis(isobutyronitrile), 2,2'-azobis(2-cyano-2-butane), dimethyl 2,2'-azobisdimethylisobutyrate, 4,4'-azobis(4-cyanopentanoic acid), 1,1'-azobis(cyclohexanecabonitrile), 2,2'-azobis(2-amidinopropane) dihydrochloride, 2-(t-butylazo)-2-cyanopropane, 2,2-azobis [2-methyl-N-(1, 1)-bis(hydroxyethyl)]propionamide, 2,2'-azobis(N,N'-dimethyleneisobutyramidine) dihydrochloride, 2,2'-azobis (N,N'-dimethyleneisobutyramine), 2,2'-azobis(2-methyl-N-[1,1-bis(hydroxymethyl)-2-hydroxyethyl]propionamide, 2,2'-azobis [2-methyl-N-(2-hydroxyethyl)propionamide], 2,2'-azobis(isobutyramide) dihydrate, 2,2'-azobis (2,2,4-trimethylpentane), 2,2'-azobis(2-methylpropane), t-butyl peroxyacetate, t-butyl peroxybenzoate, t-butyl peroxyoctoate, t-butyl peroxyneodecanoate, t-butylperoxy isobutyrate, t-amyl peroxypivalate, t-butyl peroxypivalate, di-isopropyl peroxydicarbonate, dicyclohexyl peroxydicarbonate, dicumyl peroxide, dibenzoyl peroxide, dilauroyl peroxide, potassium peroxydisulfate, ammonium peroxydisulfate, di-t-butyl, hyponitrite, and dicumyl hyponitrite.

Photochemical initiator systems are chosen to have the requisite solubility in the reaction medium or monomer mixture and have an appropriate quantum yield for radical production under the conditions of the polymerization. Examples include azo compounds, benzoin derivatives, benzophenone, acyl phosphine oxides, and photo-redox systems.

Redox initiator systems are chosen to have the requisite solubility in the reaction medium or monomer mixture and have an appropriate rate of radical production under the conditions of the polymerization; these initiating systems can include combinations of oxidants such as potassium peroxydisulfate, hydrogen peroxide, t-butyl hydroperoxide and reductants such as iron(II), titanium(III), potassium thiosulfite, and potassium bisulfite.

Other suitable initiating systems are described in recent texts. See, for example, Moad and Solomon, "The Chemistry of Free Radical Polymerization," Pergamon, London, 1995, pp. 53-95.

As previously noted, the RAFT chain transfer agents are thiocarbonylthio compounds and are of the general formula R—X—C(S)—S—R', wherein X is C, N, O, P or S; R represents a group for stabilizing the function R—X by a covalent bond of the C—X type; and R' represents a group such as the R'—S bond. By way of example, R can be a substituted or unsubstituted aryl, or a substituted or unsubstituted alkyl. The RAFT chain transfer agent is preferably soluble in polar solvents, e.g. water, alcohol, and the like. In one embodiment, the RAFT chain transfer agent is a trithiocarbonate. In still other embodiments, the RAFT chain transfer agent is 2-(2-carboxyethylsulfanylthiocarbonylsulfanyl) propionic acid or 2,2'-bis(propionic acid)trithiocarbonate.

Polymerizations of the present disclosure can occur in any suitable solvent or mixture thereof. Suitable solvents include water, alcohol (e.g., methanol, ethanol, n-propanol, isopropanol, butanol), tetrahydrofuran (THF) dimethyl sulfoxide (DMSO), dimethylformamide (DMF), acetone, acetonitrile, hexamethylphosphoramide, acetic acid, formic acid, hexane, cyclohexane, benzene, toluene, methylene chloride, ether (e.g., diethyl ether), chloroform, and ethyl acetate. Preferred solvents include water, and mixtures of water and water-miscible organic solvents such as DMF. Water is an especially preferred solvent.

As a general guide in choosing conditions for the synthesis of narrow polydispersity polymers, the concentration of initiator(s), monomers and other reaction conditions (solvent(s), temperature, pressure, and time) should be chosen such that the molecular weight of polymer formed in the absence of the chain transfer agent is at least twice that formed in its presence. In polymerizations where termination is solely by disproportionation, this equates to choosing an initiator concentration such that the total moles of initiating radicals formed during the polymerization is less than 0.5 times that of the total moles of chain transfer agent. More preferably, conditions should be chosen such that the molecular weight of polymer formed in the absence of the chain transfer agent is at least 5-fold that formed in its presence.

The polydispersity of polymers and copolymers synthesized by the method in the present disclosure can be controlled by varying the ratio of the numbers of molecules of chain transfer agent to initiator. A lower polydispersity is obtained when the ratio of chain transfer agent to initiator is increased. Conversely, a higher polydispersity is obtained when the ratio of chain transfer agent to initiator is decreased. Preferably, conditions are selected such that polymers and copolymers have a polydispersity less than about 1.5, more preferably less than about 1.3, even more preferably less than about 1.2, and yet more preferably less than about 1.1. In conventional free radical polymerizations, polydispersities of the polymers formed are typically in the range of 1.6-2.0 for low conversions (less than 10%) and are substantially greater than this for higher conversions. A polydispersity greater than 1.6 is not preferred.

With these provisos, the polymerization process is performed under the conditions typical of conventional free-radical polymerization. Polymerizations employing the above described dithiocarbonates and trithiocarbonates are suitably carried out at temperatures in the range -20 to 200° C., preferably 20 to 150° C., more preferably 50 to 120° C., or even more preferably 60 to 90° C. The pH of a polymerization conducted in aqueous solution can also be varied. The pH is selected in part so that the selected chain transfer agent is stable and propagation of the polymer occurs. Typically, the pH is from about 1 to about 8. The pH can be adjusted following polymerization, particularly when the polymer is a copolymer, such that one monomer of the copolymer is charged and another monomer is uncharged or of an opposite charge.

In view of the foregoing, the general process for synthesizing polyelectrolyte mineral dispersants, in particular a polyacrylate mineral dispersant, with a molecular weight less than 10,000 and a polydispersity less than 1.5 includes combining the acrylic acid monomer, the polymerization initiator, and the trithiocarbonate RAFT chain transfer agent in water for a period of time at an elevated temperature. The solution is then partially or completely neutralized with a base such as sodium hydroxide. The resulting acrylate polymer, also referred to herein as first polymer, has a molecular weight of less than 10,000 Daltons and a polydispersity less than 1.5, measured against sodium polyacrylate standards (American Polymer Standards Corporation, cat. no. PSS4K, PAA8K), when the proper ratios of acrylic acid, initiator and chain transfer agent are used. The acrylate polymer can then be used to disperse ground minerals, e.g., calcium carbonate, such that relatively high solids at the targeted particle size distribution are obtained. Advantageously, the slurry maintains a low viscosity while being milled and has been found to be stable over a period of time of about 15 days. Still further, Applicant has unexpectedly discovered that the inhibitor that is typically provided with the acrylic acid monomer does not need to be removed.

The acrylate polymer comprises a residue derived from the trithiocarbonate at the center of each chain. This residue can be thermally or oxidatively cleaved to form a split polymer, also referred to as a derived polyacrylate. The derived polyacrylate has a molecular weight of approximately half the molecular weight of the acrylate polymer (first polymer), and a polydispersity approximately equal to the acrylate polymer. The derived polyacrylate is also a useful polyelectrolyte mineral dispersant. Unlike the acrylate polymer, the derived polyacrylate comprises chains having endgroups derived from a trithiocarbonate residue of the acrylate polymer. The endgroups are thio-containing residues.

Depending on the extent of oxidative cleavage, the derived polyacrylate can have a mono-modal or bi-modal molecular weight distribution, as determined by gel permeation chromatography, wherein each mode has a polydispersity of less than 1.5. A mono-modal distribution indicates complete conversion of the acrylate polymer to the derived polyacrylate, and a bi-modal molecular weight distribution indicates incomplete conversion of the acrylate polymer to the derived polyacrylate. The high molecular weight component in the bi-modal distribution can be present in an amount greater than 0 and less than 25 weight percent, and more specifically less than 20 weight percent, based on the total weight of the high and low molecular weight components as determined by simple deconvolution of chromatographic peak areas. The high and low molecular weight components each have a polydispersity from 1.0 to 1.5.

In another embodiment, a method of producing a polyacrylate mineral dispersant of narrow polydispersity comprises thermally and/or oxidatively splitting a first polyacrylate produced by the above-described polymerization process to form a derived polyacrylate having half the molecular weight and about equal polydispersity compared to the first polyacrylate. The reaction conditions, amounts of initiator, and trithiocarbonate chain transfer agent are selected to produce a first polyacrylate having a molecular weight of 6000 to 20000 Daltons, more particularly 8000 to 16000 Daltons and even more particularly 10000 to 12000 Daltons, comprising a residue from a trithiocarbonate. Heating the first polyacrylate at a temperature of about 95 to about 100° C., and a pH of about 2 to about 3, for about 3 to about 5 hours, at a first polyacrylate concentration of 1 to 90 percent solids, and in other embodiments, 40 to 50 percent solids, in water produces the derived polyacrylate. The derived polyacrylate has a molecular weight of 3000 to 10000 Daltons, more particularly 4000 to 8000 Daltons, and even more particularly 5000 to 6000 Daltons. Addition of an oxidizing agent, particularly hydrogen peroxide, accelerates the reaction, and allows for lower heating temperatures. Other exemplary oxidizing agents include peracids such as peracetic or perbenzoic acid.

For some applications, the polyelectrolyte dispersants disclosed herein can further include polymers and copolymers that are not formed by reversible addition-fragmentation chain transfer polymerization, and are not derived from polymers formed from RAFT polymerization.

Mineral slurries prepared with a split polyacrylate dispersant (i.e., the second polyacrylate) are unexpectedly advantaged in their long term storage stability. The 28 day Brookfield T-bar viscosity of a slurry prepared with a split polyacrylate of Mw of 3000 to 8500 Daltons is less than 7000 cP. In contrast, a low molecular weight "unsplit" polyacrylate (first polymer) having a similar polydispersity exhibited less stability upon long term storage as will be demonstrated in the Examples below.

Using dry ground calcium carbonate as an example, the process of forming a slurry generally includes first subjecting the ground calcium carbonate to a vertical milling process. The ground calcium carbonate has an average particle size greater than 10 micrometers and is subjected to milling so as to obtain, for example, 90% of the average particles sized less than 2 micrometer with minimal fines. The vertical milling process includes mixing water and the ground calcium carbonate with appropriately sized milling beads. To this mixture, the polymer dispersant, e.g., polyacrylate having a molecular weight less than 10,000 Daltons and at a polydispersity of less than 1.5 is sequentially added. Average particle size is periodically measured and once the desired average particle size is obtained, the milling is discontinued and the media is filtered from the slurry.

The following examples are presented for illustrative purposes only, and are not intended to limit the scope of the invention. In these examples, polymer concentrations in their aqueous solutions were determined by measuring the ratio of sample mass after evaporation of volatiles from about 0.5 g of polymer solution at 130° C. for 30 minutes to the original mass and are reported as percent-solids.

The average molecular weights (Mw) and polydispersities (PDI=Mw/Mn) of polymers were measured by size exclusion chromatography (SEC) on a Waters Alliance LC 2690 instrument supplied with a column oven and a Waters 2410 refractive index detector. The instrument was operated with an eluent flow rate of 0.65 mL/min at 30° C. through a guard column followed by three consecutive Waters Ultrahydrogel columns (120/250/500 angstroms). Typical column pressures were 800 to 1000 psi. The eluent was a 45 micrometer filtered deionized water solution of 0.85 wt % NaNO3, 0.05 wt % NaN3, and 4 wt % of a concentrated pH 7 buffer (Fisher SB109-1). All polymer samples were prepared by diluting the polymer or polymer solution with eluent to 0.25 dry equivalent wt % and passing through a 45 micrometer filter. All inventive polymer samples were prepared directly from their synthesis solutions without isolation. Polymer solutions (100 microliter) were injected onto the SEC columns and chromatograms were recorded over approximately 60 minutes. Molecular weight calibration curves were generated using Waters Millennium software version 3.2, from peak retention times and reported weight average and number average molecular weights of six sodium polyacrylate standards. Two polymer standards (American Polymer Standards Corporation, PSS4K, PAA8K) were analyzed immediately prior to each inventive polymer sample for calibration confirmation.

Average particle sizes and particle size distributions of the ground calcium carbonate (GCC) mineral slurries were measured by diluting 5 grams of a 75 wt % mineral slurry to 100 g with tap water and analyzing on a Micromeritics Sedigraph 5100 instrument. WIN5100 V2.03 software was used for data collection and analyses using a sample density of 2.750 g/mL for GCC.

COMPARATIVE EXAMPLE 1

In this example, the polyacrylate polymer (PA) was prepared. Acrylic acid (340 g) and a 0.185 M aqueous ammonium persulfate solution (79 g) were added over four hours to 680 g of a 6:1 wt ratio 2-propanol:water solution at 80° C. with heating continued for an additional hour. The polyacrylate solution was neutralized to pH about 8.3 with sodium hydroxide. Agitation was stopped such that an upper 2-propanol layer separated from a lower water layer. Most all of the polyacrylate was partitioned into the water layer. Residual 2-propanol was removed from the isolated polyacrylate-water layer by distillation, which was then diluted with additional water (290 g). Mw=5470; PDI=2.3.

COMPARATIVE EXAMPLE 2

In this example, fractionated polyacrylate (PA-frac) was prepared following the method set forth in Example 1 except that the polymer is neutralized to only 25% with sodium hydroxide (47 g) before the 2-propanol and polymer-water layers are separated. This partial neutralization leaves significant low molecular weight polyacrylate in the upper 2-propanol layer and is discarded along with that layer, thus fractionating the polyacrylate and decreasing the polydispersity of the remaining polyacrylate. The polyacrylate-water layer is fully neutralized after distillation of the residual 2-propanol. Mw=5840; PDI=2.01.

EXAMPLE 3

In this example, a controlled polymerization polyacrylate (PA-control-1) was prepared in water using 4,4'-azobis(4- cyanopentanoic acid) as the free radical initiator and 2-(2-carboxyethylsulfanylthiocarbonylsulfanyl)propionic acid as chain transfer agent (CTA-1). The acrylic acid, azo initiator, and CTA-1 were combined in a mol ratio of 765:1:17, respectively, using 155 mL of a 3.5 M aqueous acrylic acid solution in a 0.5 L flask fitted with a condenser. The acrylic acid inhibitor was not removed. The solution was purged with nitrogen for 30 minutes then heated to 90° C. for four hours. The polymer solution was cooled to room temperature, and then neutralized to pH about 8.3 with a 50% wt/wt aqueous sodium hydroxide solution. Mw=5637; PDI=1.29.

EXAMPLE 4

In this example, a controlled polymerization polyacrylate (PA-controlled-2) was synthesized in accordance with the procedure set forth in Example 3 except that a solution of the initiator, acrylic acid, and half the water was added over 30 minutes to CTA-1 dissolved in the balance of the water that was heated to 90° C. Heating was continued for four hours at which time the solution was cooled, and then neutralized to pH about 8.3 with sodium hydroxide. Mw=4956; PDI=1.23. The low Mw and PDI demonstrate that polymers useful for this disclosure can be synthesized by semi-batch processes in addition to batch processes as described in Example 3. The results are summarized in Table 1.

EXAMPLE 5

In this example, a controlled polymerization polyacrylate (PA-control-3) was prepared as in Example 3 except that 2,2'-bis(propionic acid)trithiocarbonate (CTA-2) was used as the chain transfer agent and the acrylic acid:azo initiator: CTA-2 mol ratio was 1691:1:16.7, respectively, using 80 mL of a 6.94 M aqueous acrylic acid solution in a 0.25 L flask fitted with a condenser and mechanical stirrer. The acrylic acid inhibitor was not removed. The solution was purged with nitrogen for 30 minutes then heated to 90° C. for four hours. The polymer solution was cooled to room temperature, and then neutralized to pH about 8.3 with a 50% wt/wt aqueous sodium hydroxide solution. Mw=10,208; PDI=1.15.

EXAMPLE 6

In this example, a controlled polymerization polyacrylate (PA-control-4) was prepared as in Example 5 except that the acrylic acid:azo initiator: CTA-2 mol ratio was 993:1:16.7, respectively, using 90 mL of a 6.94 M aqueous acrylic acid solution. Mw=5,762; PDI=1.16.

TABLE 1

| Polymer | Mw | PDI |
| --- | --- | --- |
| Comp. Ex. 1 | 5,470 | 2.30 |
| Comp. Ex. 2 | 5,840 | 2.01 |
| Ex. 3 | 5,637 | 1.29 |
| Ex. 4 | 4,956 | 1.23 |
| Ex. 5 | 10,208 | 1.15 |
| Ex. 6 | 5,762 | 1.16 |

EXAMPLE 7

Figure 1:
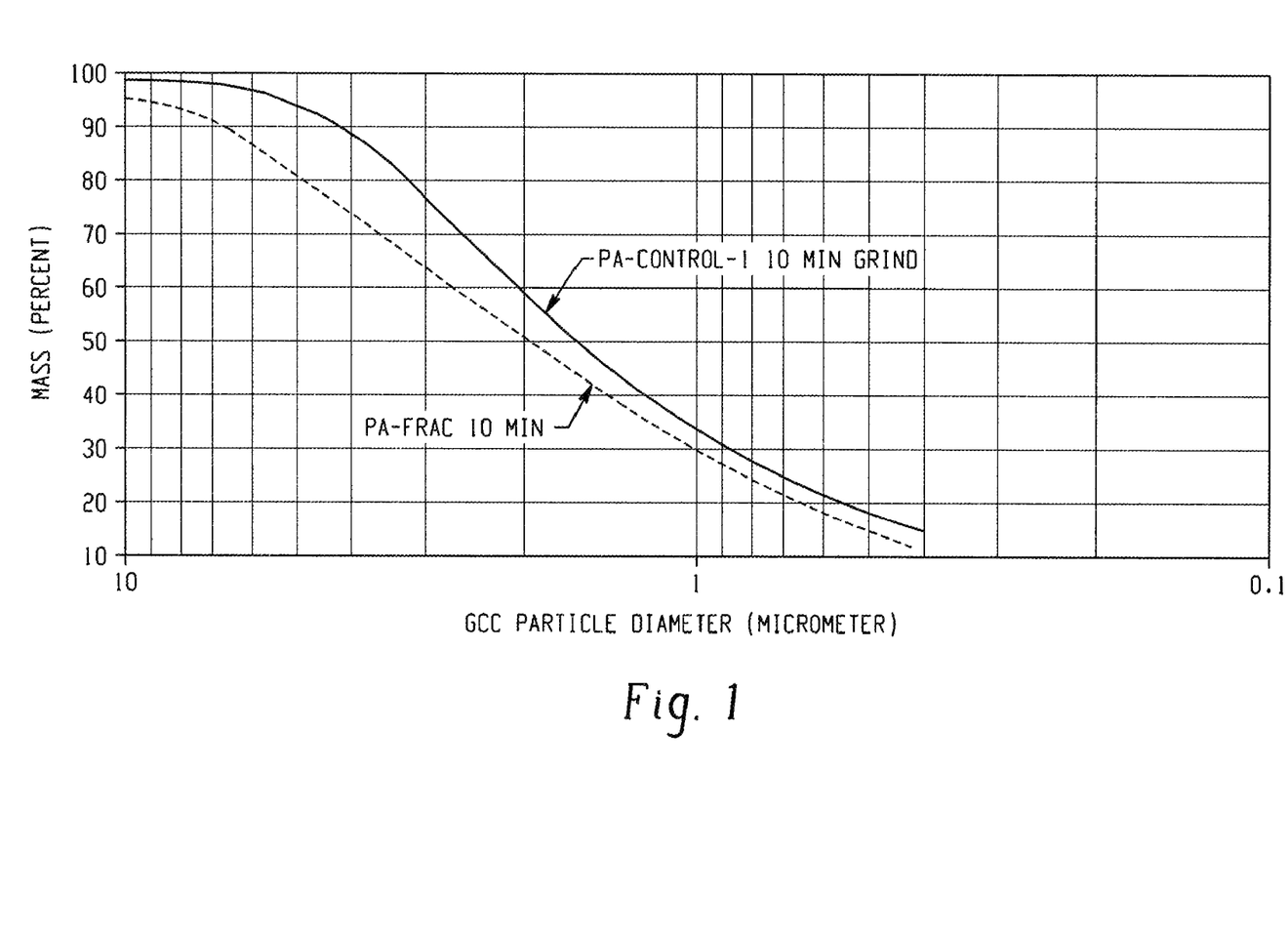
FIG. 1 graphically illustrates mass percent as a function of particle diameter for ground calcium carbonate (GCC) slurries prepared with dispersants of different polydispersities after 10 minutes of grinding on a vertical mill.
Figure 2:
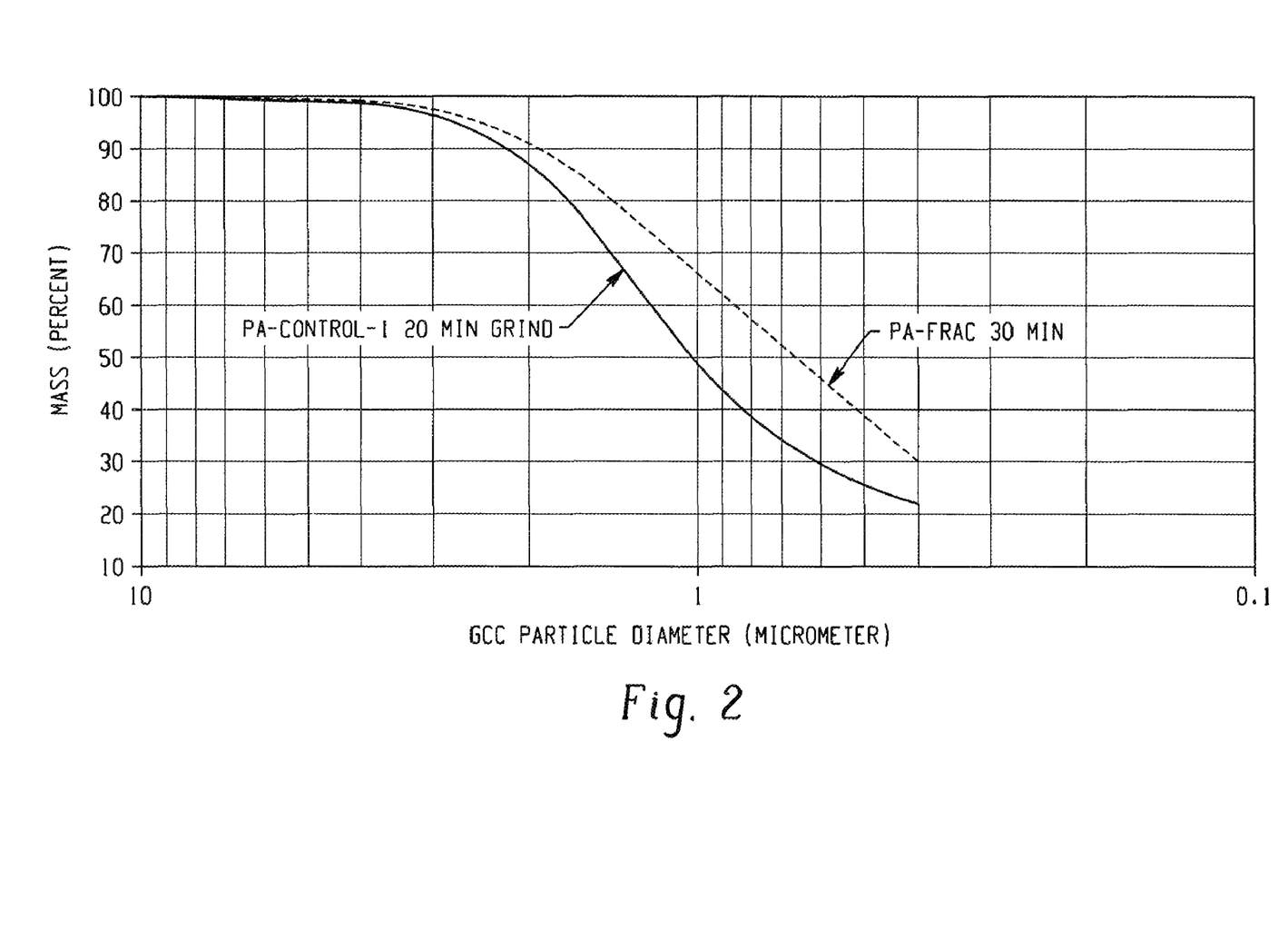
FIG. 2 graphically illustrates mass percent as a function of particle diameter for ground calcium carbonate slurries prepared with dispersants of different polydispersities on a vertical mill indicating the times required for each dispersant to reach about 90% mass having a particle diameter less than 2.0 micrometers and differences in their particle diameter distributions.
Figure 3:
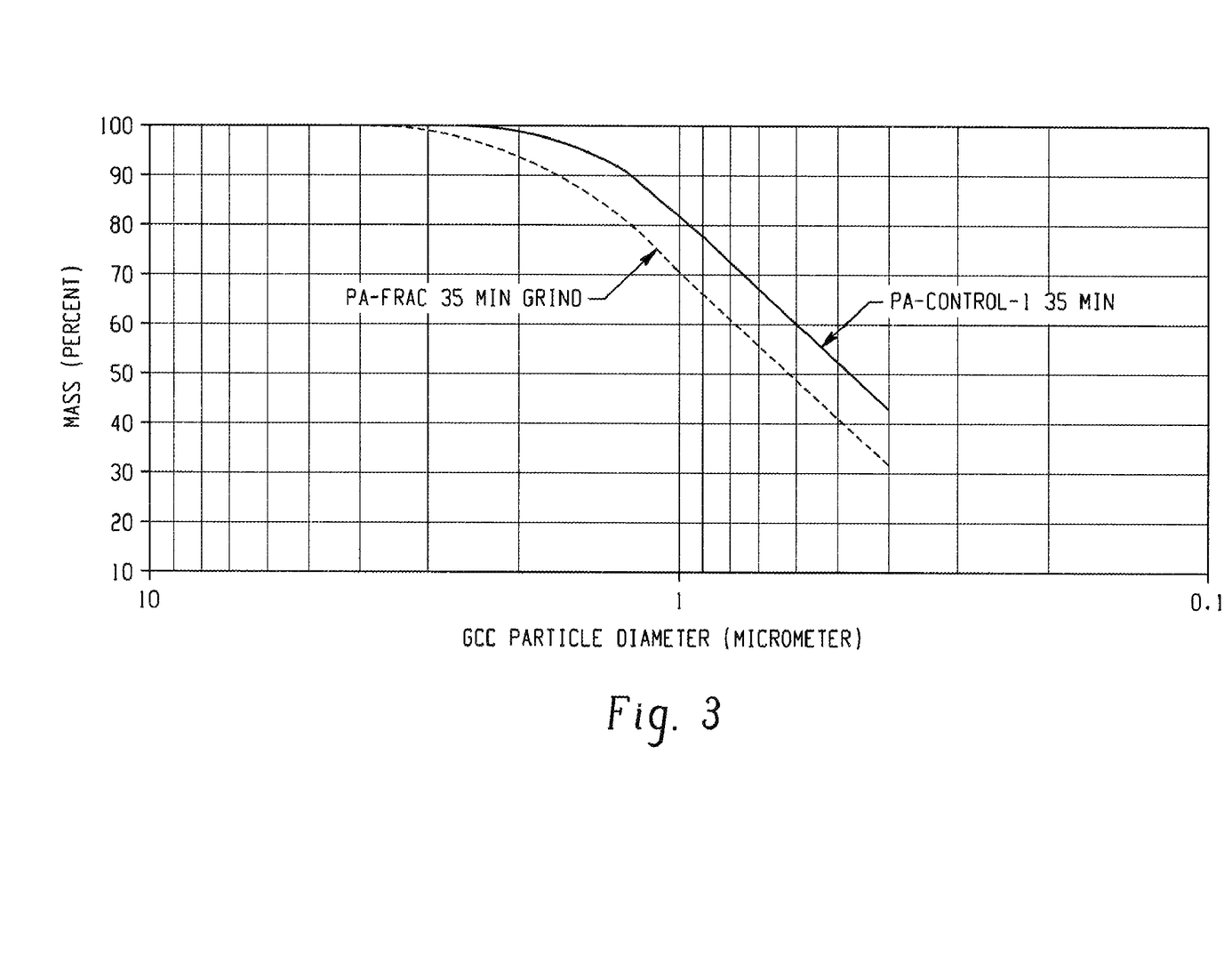
FIG. 3 graphically illustrates mass percent as a function of particle diameter for ground calcium carbonate slurries prepared with dispersants of different polydispersities after 35 minutes of grinding on a vertical mill.

In this example, ground calcium carbonate was milled in a vertical mill using the PA-frac or PA-control-1 polyacrylates obtained in Comparative Example 2 and Example 3, respectively. Water (933 g) and either PA-frac or PA-control-1 (2.40 g of dry, neutralized polymer in aqueous solution) were combined and mixed in a vertical media mill (Szegvari Attritor Type P; 8.5 in. W×10 in. H bowl; Agitator=4 arms; ⅞ in.×7 in.) for five minutes at approximately 200 revolutions per minute (rpm) shaft speed. Ground calcium carbonate (GCC), 2400 g, about 10-13 micrometer median particle size, was added to the polymer solution and mixed for approximately five minutes to wet the GCC. The media (3.6 L, 0.8-1.0 mm, ceramic) was added to the slurry and the mill shaft speed was increased to 594 rpm. Additional polymer solution (2.40 g of dry, neutralized polymer in aqueous solution) was added at 5, 10, 15, 20, and 25 minutes for a total of 14.4 g of dry, neutralized polymer in aqueous solution, added to the GCC slurry (equivalent to 12 lb dry, neutral dispersant to 1 ton GCC). Slurry aliquots (about 5 mL) were taken at 5 minute intervals of milling and their particle size distributions were measured. Water (15 mL at 10 minutes; 20 mL at 20 minutes; 30 mL at 30 minutes) was added to the slurry during the milling to counteract water evaporation and to maintain constant visual viscosity during the 35 minutes of milling while allowing sufficient water evaporation to raise the initial GCC solids of 72% to about 75%. The particle size distributions of the seven aliquots for each polymer are reported in Table 2 and are shown in FIGS. 1-3.

TABLE 2

| | 10 Micrometer | 5 Micrometer | 2 Micrometer | 1 Micrometer | 0.5 Micrometer | 0.4 Micrometer |
| --- | --- | --- | --- | --- | --- | --- |
| Comp. Ex. 2 PA-frac | | | | | | |
| 5 min | 75.9% | 55.2% | 31.7% | 17.5% | 8.4% | 6.1% |
| 10 min | 95.5 | 80.4 | 49.4 | 29.2 | 14.6 | 10.8 |
| 15 min | 98.6 | 93.1 | 63.2 | 38.9 | 20.3 | 16.1 |
| 20 min | 99.2 | 97.8 | 74.7 | 48.3 | 26.3 | 20 |
| 25 min | 99.5 | 98.9 | 84.3 | 56.3 | 32.2 | 25.8 |
| 30 min | 99.9 | 99.5 | 90.2 | 63.8 | 37.8 | 30.6 |
| 35 min | 99.8 | 99.5 | 94.1 | 69.5 | 40.9 | 32.2 |
| Example 3 PA-control-1 | | | | | | |
| 5 min | 92.2% | 73.2% | 41.1% | 22.4% | 10.1% | 8.5% |
| 10 min | 98.6 | 94.1 | 59.5 | 32.9 | 17.2 | 13.9 |
| 15 min | 99.2 | 98.8 | 82.8 | 52.6 | 28.7 | 23 |
| 20 min | 99.6 | 99.4 | 88.5 | 50.1 | 26.4 | 21.8 |

TABLE 2-continued

|  | 10 Micrometer | 5 Micrometer | 2 Micrometer | 1 Micrometer | 0.5 Micrometer | 0.4 Micrometer |
|---|---|---|---|---|---|---|
| 25 min | 99.8 | 99.6 | 95.3 | 69.4 | 40.6 | 33.5 |
| 30 min | 99.9 | 99.8 | 97.3 | 76.8 | 47 | 38.1 |
| 35 min | 99.4 | 99.8 | 98.4 | 81.5 | 51.6 | 43.2 |

Within the first 10 minutes of grinding (FIG. 1) and at the same polymer dose, PA-control-1 unexpectedly milled the GCC to a lower particle size than PA-frac. Further it was unexpectedly observed that PA-control-1 ground the larger GCC particle fraction preferentially over the smaller particle size fraction thus yielding a narrower particle size distribution than PA-frac. That is, after 10 minutes of grinding the PA-frac treated slurry had only 80.4% of the GCC less than 5 micrometer while the PA-control-1 treated slurry had ground 94.1% of the GCC to less than 5 micrometer. In contrast, the PA-frac and PA-control-1 ground the GCC to approximately the same extent as measured by the percent of GCC particles less than 0.5 micrometer (14.6% and 17.2% respectively) after 10 minutes.

Figure 4:
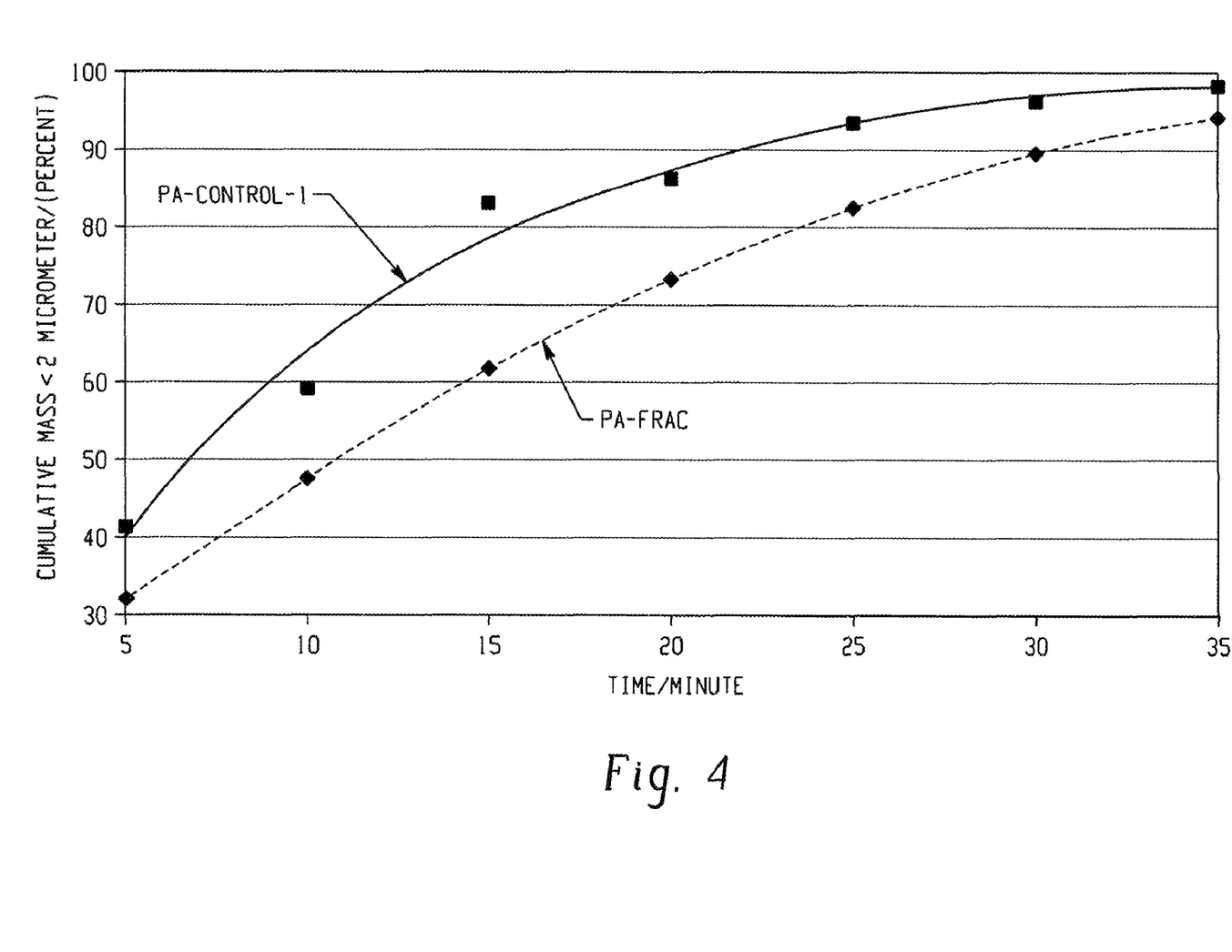
FIG. 4 graphically illustrates % cumulative mass of the ground calcium carbonate having a particle diameter that is less than 2 micrometers as a function of time for ground calcium carbonate slurries prepared on a vertical mill with dispersants of different polydispersities.

A common particle size target for wet-ground GCC used in paper production is to have 90% of the GCC particles less than 2.0 micrometer. There are substantial cost benefits for reaching this particle size target in the shortest manufacturing time to maximize production throughput. The data of this Example, presented in FIGS. 2 and 4 demonstrate that polymers of this disclosure, e.g. PA-control-1, unexpectedly reach this particle size target faster (about 21 minutes) than the polymer representing the current technology, e.g. PA-frac, (about 30 minutes), thereby representing a significant commercial advantage. Also advantageous and unexpected, less PA-control-1 (9.77 g) is needed to reach this target than PA-frac (14.66 g) further providing lower manufacturing costs.

FIG. 3 presents the particle size distribution at the conclusion of vertical milling after which further particle size reduction is negligible. Surprisingly, the polymer of this disclosure, PA-control-1, is able to achieve a smaller particle size distribution than that of the current technology, PA-frac, within industrially practical grinding timeframes. Reaching smaller particle size distributions can benefit paper and paint coating optical properties especially if low viscosities can be maintained.

EXAMPLE 8

Figure 5:
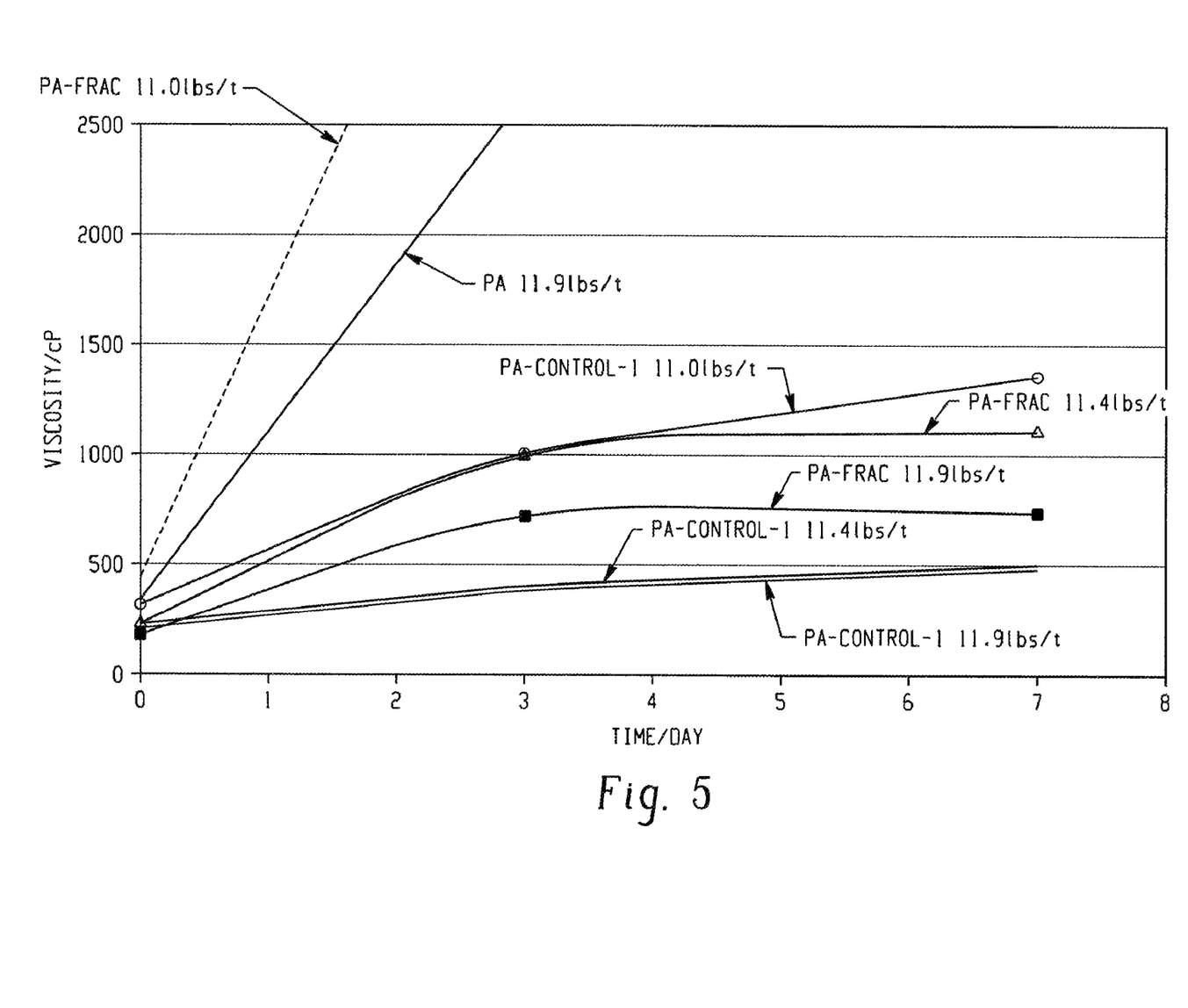
FIG. 5 graphically illustrates static viscosity as a function of time for ground calcium carbonate slurries prepared on a vertical mill with dispersants of different polydispersities and dosing in dry pounds per dry ton (lbs/t)

In this example, GCC slurries were prepared and milled in a vertical mill using PA, PA-frac, and PA-control-1 as prepared in Comparative Examples 1, 2 and Example 3, respectively. A range of total polymer concentrations were used: 7.63 g, 7.92 g, 8.21 g, 8.57 g, 8.86 g. These correspond to 10.6, 11.0, 11.4, 11.9, and 12.3 [dry lbs neutralized polymer/dry ton GCC] (Table 3). Water (560 g) and either the PA, or the PA-frac or the PA-control-1 (equivalent to one-sixth of the total dry, neutralized polymer in aqueous solution) were combined and mixed in a vertical media mill (Szegvari Attritor Type 1ST; 7.5 in. W×8 in. H bowl; Agitator=5 arms; 5/8 in.×6.5 in.) for five minutes at approximately 200 revolutions per minute (rpm) shaft speed. Ground calcium carbonate (GCC, 1440 g, about 10-13 micrometer median particle size) was added to the polymer solution and mixed for approximately five minutes to wet the GCC. The media (4 Kg, 0.8-1.0 mm, ceramic) was added to the slurry and the mill shaft speed was increased to 850 rpm. Additional polymer solution, equivalent to one-sixth of the total dry, neutralized polymer, was added at 5, 10, 15, 20, and 25 minutes. Water was added to the slurry as needed to counteract water evaporation during milling and to maintain constant visual viscosity during the milling while allowing sufficient water evaporation to raise the initial GCC solids of 72% to about 75%. No aliquots were taken and milling was stopped when 90% cumulative GCC particle mass was less than 2.0 micrometer. These slurries were poured through a 100 mesh classifier screen to separate the slurry from the media and then cooled to room temperature. The slurry solids were measured using a CEM Labwave 9000 moisture analyzer with the target being 75.0 wt % and adjusted if necessary. Initial viscosities (0 day) were measured with a Brookfield RVT viscometer at 20 rpm with #3 spindle at 25° C. The slurries were stored undisturbed for three days at which time the 'static' viscosities were again measured with minimal disturbance or shearing. The final 'static' viscosities were measured on the undisturbed slurries at the end of seven days. Results are presented in Table 3 and FIG. 5.

TABLE 3

Static viscosities of initial and aged GCC slurries from vertical milling using a range of polymer doses.

| Dose[a] | Solids (%) | 0 day (cP) | 3 days (cP) | 7 days (cP) |
|---|---|---|---|---|
| Comp. Ex. 1 (PA) | | | | |
| 11.9 | 74.97 | 293 | 2620 | — |
| Comp. Ex. 2 (PA-frac) | | | | |
| 10.6 | 75.01 | —[b] | — | — |
| 11.0 | 74.99 | 398 | 3840 | 4872 |
| 11.4 | 75.06 | 212 | 1006 | 1117 |
| 11.9 | 75.03 | 181 | 722 | 738 |
| 12.3 | 75.14 | 179 | 701 | 845 |
| Example 3 PA-control-1 | | | | |
| 10.6 | 75.06 | 440 | 1920 | 2340 |
| 11.0 | 74.99 | 320 | 1020 | 1370 |
| 11.4 | 75.04 | 227 | 420 | 500 |
| 11.9 | 75.02 | 210 | 395 | 480 |
| 12.3 | 74.96 | 185 | 300 | 330 |

[a]Dose units = [dry lbs neutralized polymer/dry ton GCC]
[b]The slurry prepared with PA-frac at 10.6 dry lbs polymer/dry ton GCC was too viscous to process.

All polymers at all doses have relatively low viscosities immediately after milling, removing media, and cooling to 25° C. (0 day viscosity). However, large undesirable increases in viscosities are measured at three and seven days in the undisturbed slurries in many of the samples primarily in the PA and PA-frac-treated slurries. The PA-frac-treated slurry at 10.6 [dry lbs polymer/dry ton GCC] dose was too viscous to process. The best performing polymer, PA-control-1, exhibited the most constant viscosity over the entire seven-day evaluation at ≧11.4 [dry lbs polymer/dry ton GCC]. PA-frac gave its lowest slurry viscosity at 11.9 [dry lbs polymer/dry ton GCC] though still not as low a viscosity as provided by PA-control-1. Higher doses of PA-frac only degraded performance (increased viscosity).

The observation that less PA-control-1 can be used for achieving performance that is unattainable by higher doses of PA-frac is further advantageous since using less polymer can provide cost savings and furthermore can avoid deleterious interactions with other chemicals used in papermaking processes and coatings formulations. Particle agglomeration problems resulting from spray drying mineral slurries that contain polymers can also be minimized.

EXAMPLE 9

In this example, GCC slurries were prepared and milled in a horizontal mill using PA-frac-2 (fractionated sodium polyacrylate, Dispex® 2695, Mw about 5900, PDI about 2.00; a commercial equivalent to PA-frac) and PA-control-4 (functionally equivalent to PA-control-1) as prepared in Example 6. Water (200 g) and either PA-frac-2 or PA-control-4 (7.20 g of dry, neutralized polymer in aqueous solution) were combined and mixed in a stainless steel beaker. Ground calcium carbonate (300 g, about 10-13 micrometer median particle size) was then added to the polymer solution and the contents were mixed with a spatula until the GCC was completely wet. A second 300 g of GCC was added and again mixed until the GCC was completely wet. The slurry was mixed on a Hamilton Beach mixer (Model 950) at medium speed for 10 minutes. A second, identical slurry batch was prepared and both slurries were combined in the horizontal mill (Eiger Machinery, Inc. "Mini" Mill; 250 mL chamber charged with 0.8 to 1.0 mm ceramic media at 60% volume). The horizontal mill was operated at 4000 rpm for 90 minutes while the slurry was recirculated through the reservoir and cooled by running tap water through the chamber cooling jacket. Slurry aliquots (about 5 mL) were taken at 15 minute intervals of milling from the mill reservoir and their particle size distributions were measured. The particle size distributions of the six aliquots for each polymer are reported in Table 4 and in FIG. 6.

At the end of the 90 minute milling the slurry solids were measured with the target being 75.0 wt % and adjusted if necessary. Initial viscosities (0 day) were measured with a Brookfield RVT viscometer at 20 rpm with #3 spindle at 25° C. The slurries were stored undisturbed for three days at which time the viscosities were again measured with minimal disturbance or shearing. The final viscosities were measured on the undisturbed slurries at the end of seven days. Results are presented in Table 5 and FIG. 7.

TABLE 5

Static viscosities of initial and aged GCC slurries from horizontal milling.

| Dose[a] | Solids (%) | 0 day (cP) | 3 days (cP) | 7 days (cP) |
|---|---|---|---|---|
| PA-frac-2 | | | | |
| 24.0 Example 6 PA-control-4 | 75.15 | 290 | 1390 | 2150 |
| 24.0 | 74.89 | 470 | 4435 | —[b] |

[a]Dose units = [dry lbs neutralized polymer/dry ton GCC]
[b]The viscosity was above the scale of the instrument as configured.

Figure 6:
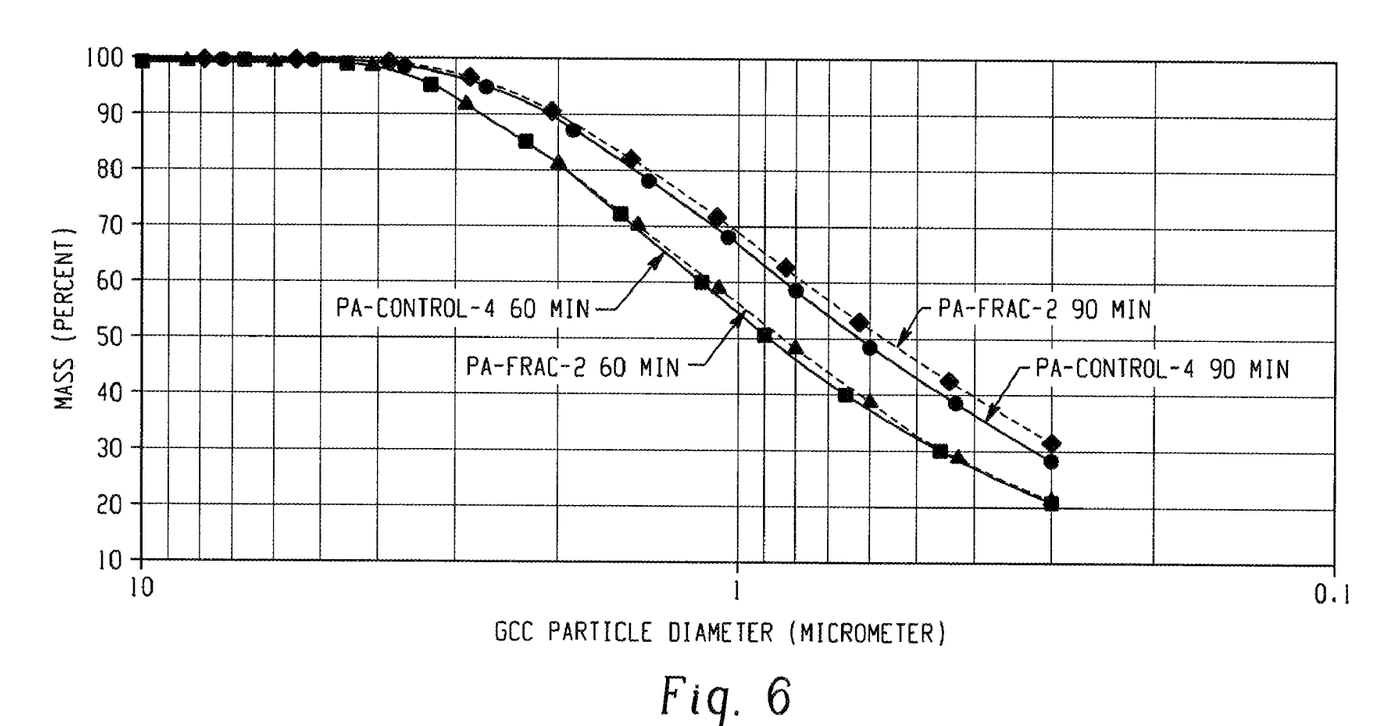
FIG. 6 graphically illustrates mass percent as a function of particle diameter for ground calcium carbonate slurries prepared with dispersants of different polydispersities after 60 and 90 minutes of grinding on a horizontal mill.

At 60 minutes of horizontal milling the milling performances of the two polymers, PA-frac-2 and PA-control-4, were equivalent, having generated the same particle size distributions though neither had reached the target of 90% of the GCC less than 2 micrometer (FIG. 6). Only after 90 minutes of milling was the particle size target reached by both GCC slurries at which time PA-frac-2 was surprisingly able to mill the GCC to a further extent than the lower PDI polymer, PA-control-4.

Figure 7:
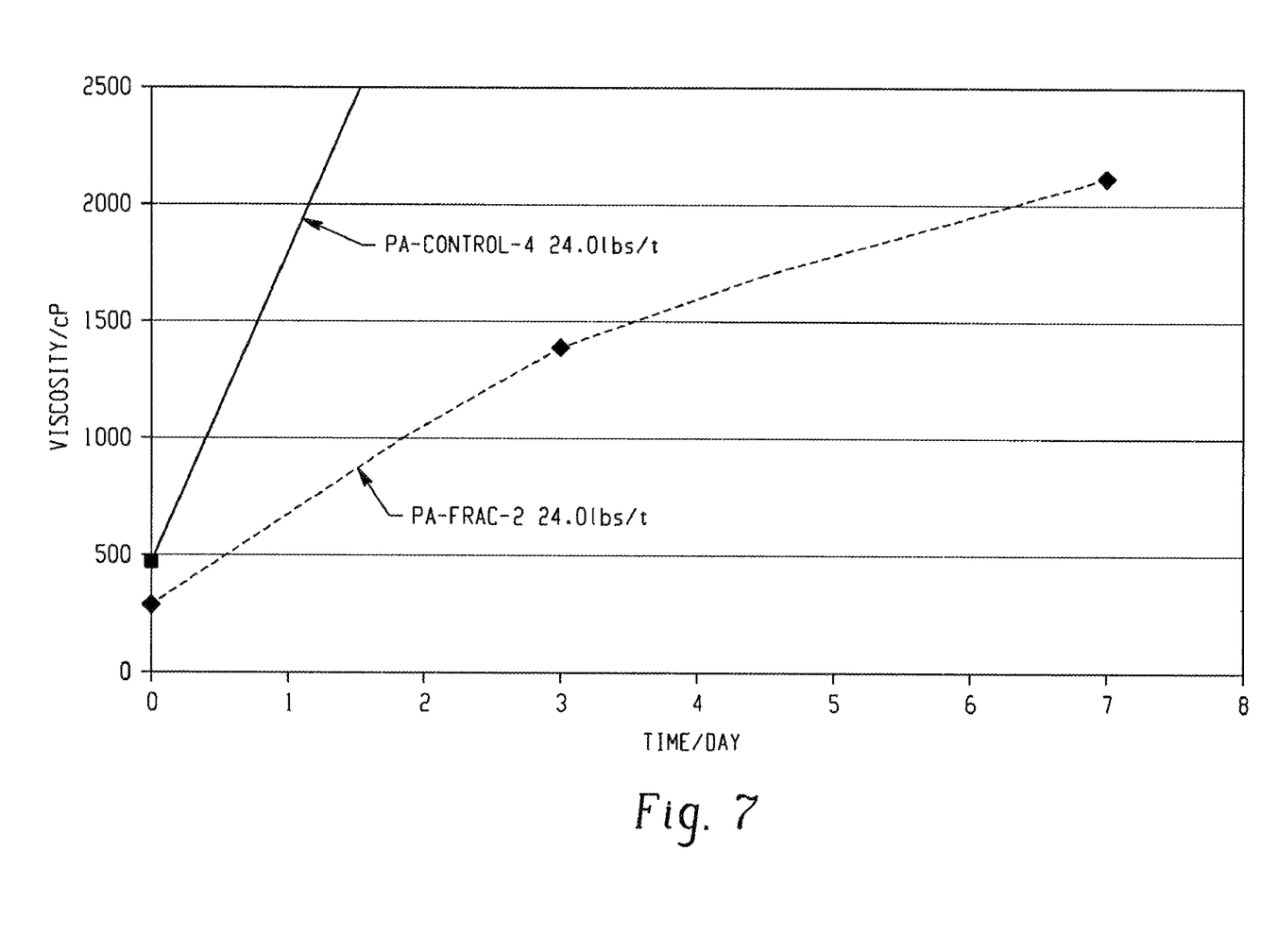
FIG. 7 graphically illustrates static viscosity as a function of time for ground calcium carbonate slurries prepared with dispersants of different polydispersities on a horizontal mill.

It was further unexpectedly observed that the viscosities of the two slurries from horizontal milling are reversed from the viscosities of the slurries from vertical milling. That is, the current technology fractionated polymer yielded the preferred, lower, more stable viscosity than the lower PDI polymer of this disclosure (FIG. 7).

Collectively, it is therefore demonstrated that the low PDI polymers have no advantage in horizontal mill processing and it would have been expected by those skilled in the art that any milling differences rendered by different polymers added to aid grinding or dispersing, would have been translated into other media milling configurations (e.g. vertical milling).

TABLE 4

| | 10 Micrometer (%) | 5 Micrometer (%) | 2 Micrometer (%) | 1 Micrometer (%) | 0.5 Micrometer (%) | 0.3 Micrometer (%) |
|---|---|---|---|---|---|---|
| PA-frac-2 | | | | | | |
| 15 min | 96.2 | 72.6 | 39.2 | 22.4 | 11.1 | 4.2 |
| 30 min | 99.7 | 93.4 | 60.4 | 38 | 20.4 | 10.6 |
| 45 min | 99.6 | 98.1 | 73.8 | 49.2 | 28.9 | 18.5 |
| 60 min | 99.8 | 99 | 82 | 56.8 | 34.7 | 21.3 |
| 75 min | 99.6 | 99.9 | 88 | 62.7 | 40.1 | 25 |
| 90 min | 99.7 | 99.7 | 91.8 | 68.4 | 45.6 | 31.4 |
| Example 6 PA-control-4 | | | | | | |
| 15 min | 96.8 | 73.5 | 38.9 | 22.1 | 10.5 | 5.5 |
| 30 min | 99.3 | 93.8 | 59.9 | 37.1 | 21.1 | 10.8 |
| 45 min | 99.2 | 98 | 72.9 | 47.5 | 28.3 | 17.4 |
| 60 min | 99.4 | 99.4 | 81.4 | 55.2 | 34.1 | 20.8 |
| 75 min | 99.2 | 99.2 | 87.1 | 61.5 | 38 | 25 |
| 90 min | 99.5 | 99.7 | 90.9 | 66.6 | 42 | 27.8 |

Surprisingly, the low PDI polymers provided significant benefits of faster coarse particle fraction milling, faster milling to a target median particle size, finer ultimate particle size distribution, and lower aged slurry viscosities at lower dose levels when these polymers are utilized on a vertical media mill though not on a horizontal media mill. Previous results using low PDI polymers of this disclosure for milling minerals on horizontal mills would not predict our vertical mill results.

EXAMPLE 10

In this example a controlled polymerization polyacrylate (PA-control-5) was prepared using 2,2'-azobis(2-amidinopropane)dihydrochloride as the free radical initiator in a semibatch process. Acrylic acid (77 g), CTA-2 (104 g, 0.70 M aqueous solution), water (246 g), and initiator (1.21 g) were combined in a 1 L, 3 neck flask fitted with a condenser, mechanical stirrer, and septum cap. The solution was purged with nitrogen for 30 minutes then heated to about 90° C. Additional acrylic acid (232 g) and initiator (1.21 g) were added over about 1 hour. After 3 hours of additional heating, the polymer solution was cooled to room temperature, and then neutralized to pH about 8.2 with sodium hydroxide (50 wt %). Mw=5707; PDI=1.41.

EXAMPLE 11

Split polyacrylate, PA-control-6

In this example a controlled polymerization polyacrylate (PA-control-6) was prepared in accordance with the procedure set forth in Example 10 except that a higher molecular weight polymer was first produced, then further treated to obtain a polyacrylate with half the original molecular weight. Acrylic acid (48 g), CTA-2 (55 g, 0.70 M aqueous solution), water (266 g), and initiator (0.146 g) were combined in a 1 L, 3 neck flask fitted with a condenser, mechanical stirrer, and septum cap. The solution was purged with nitrogen for 30 minutes then heated to about 90° C. Additional acrylic acid (274 g) and initiator (0.830 g) were added over about 1 hour. After 3 hours additional heating, the polymer solution was cooled to room temperature, and then neutralized to pH about 8.2 with sodium hydroxide (50 wt %). The polymer solution was then heated to 60° C. and hydrogen peroxide (75 g, 30 wt % aqueous solution) was added over about 1 hour. Mw=8032; PDI=1.47.

TABLE 6

| Sample | % Solids | pH | Mw | PDI |
| --- | --- | --- | --- | --- |
| PA-frac-2 | 44.00 | 8.3 | 5965 | 2.01 |
| PA-control-5 | 43.90 | 8.2 | 5707 | 1.41 |
| PA-control-6 | 44.10 | 8.2 | 8032 | 1.47 |

EXAMPLE 12

Figure 8:
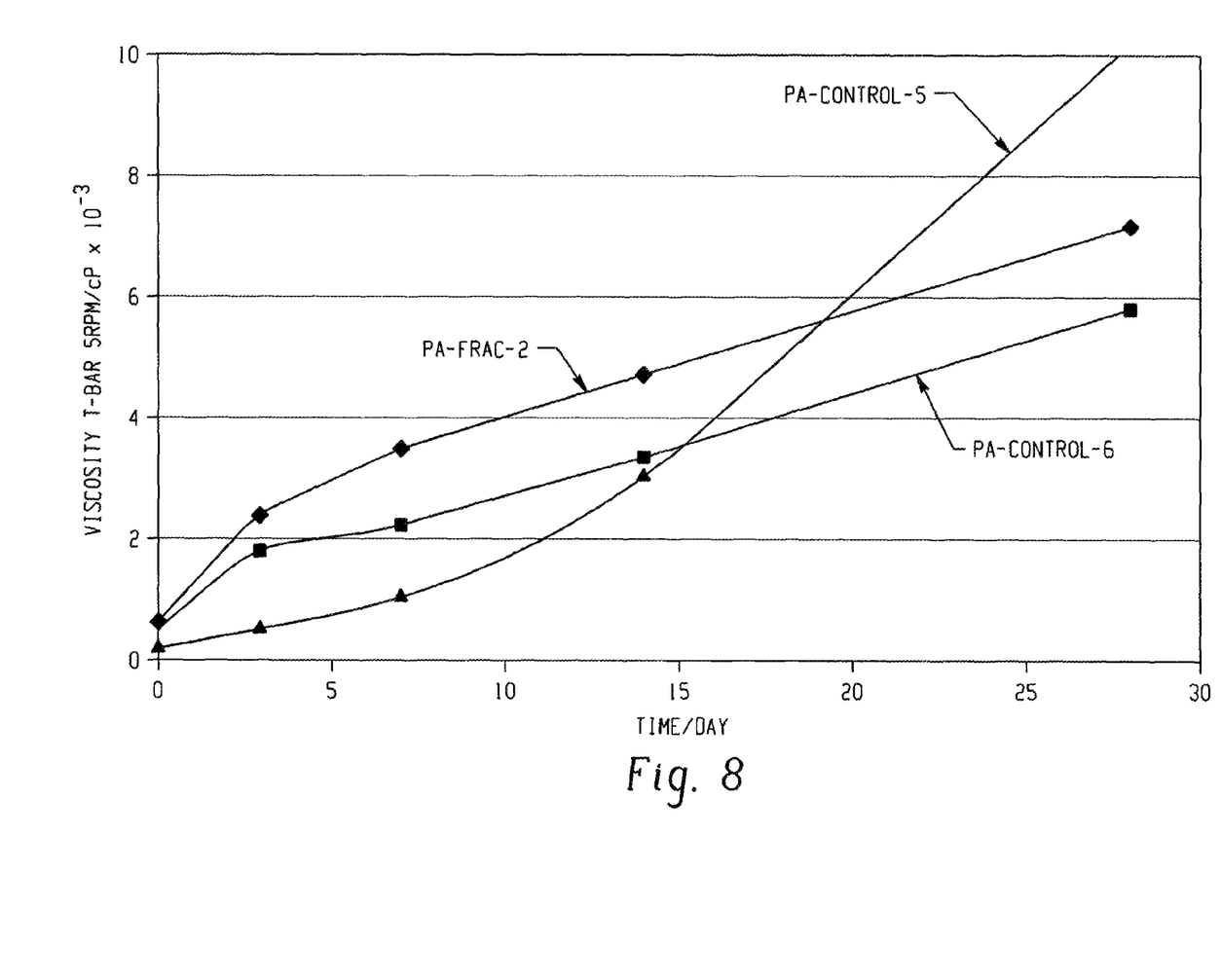
FIG. 8 graphically illustrates static viscosities measured with a Brookfield T-bar spindle of initial and aged ground calcium carbonate slurries prepared in a vertical mill.

In this example, GCC slurries were prepared and milled in a vertical mill in accordance with the procedure set forth in Example 8 with the following exceptions. The polymer solutions, PA-frac-2 (commercial fractionated polyacrylate), PA-control-5 of Example 10, or PA-control-6 of Example 11, were each used at a total polymer concentration of 12.0 dry lbs neutralized polymer/dry ton GCC. Water (604 g) and 48 wt % of one of the above polymer solutions were combined and mixed in the vertical mill for five minutes at low shaft speed. GCC (1553 g, about 10-13 micrometers median particle size) was added to the polymer solution, mixed for five minutes, followed by adding 3861 g ceramic media of 0.8 to 1.0 mm spherical diameter, and increasing the mill shaft speed to 850 rpm. The remaining polymer solution was added in three equal parts at ten minute intervals. Water was added to the slurry as needed to partially counteract water evaporation during milling. Milling was stopped when 90% cumulative GCC particle mass was less than 2 micrometers particle diameter. The slurry was separated from the media, cooled to room temperature and adjusted to 75% solids as necessary (Table 7). Initial viscosity readings (0 day) were measured in the middle of the slurry samples with a Brookfield DV-II+ viscometer fitted with a heliopath stand and a T-B t-bar spindle at 25° C. Subsequent viscosity readings on undisturbed slurries were taken at 3, 7, 14, and 28 days with minimal shearing. Readings are presented in Table 8 and FIG. 8.

TABLE 7

GCC Slurry Percent Solids and Particle Size Distributions

| Sample | Slurry % Solids | Particle Size of 2 Micrometer (%) | Particle Size of 1 Micrometer (%) |
| --- | --- | --- | --- |
| PA-frac-2 | 75.11 | 90.6 | 64.1 |
| PA-control-5 | 75.08 | 92.5 | 64.0 |
| PA-control-6 | 75.19 | 92.3 | 64.1 |

TABLE 8

T-Bar Viscosity

| Sample ID | Initial (cP) | 3-Day Static (cP) | 7-Day Static (cP) | 14-Day Static (cP) | 28-Day Static (cP) |
| --- | --- | --- | --- | --- | --- |
| PA-frac-2 | 640 | 2320 | 3360 | 4800 | 7440 |
| PA-control-5 | 240 | 480 | 1040 | 3040 | 10160 |
| PA-control-6 | 480 | 1760 | 2240 | 3360 | 5840 |

A Brookfield T-bar spindle was used in these viscosity measurements because T-bar viscosities can be significantly different than those collected using Brookfield disk shaped spindles. All slurry viscosities were initially low as measured with the T-bar spindle. These viscosities increased uniformly for about 14 days with the PA-control-5 prepared slurry exhibiting the lowest, most advantageous viscosity while the slurry prepared with the PA-frac-2 polymer exhibiting the highest, poorly stable viscosity. Surprisingly, however, the viscosity of the lowest viscosity slurry increases rapidly beyond about 14 days such that it has the highest viscosity beyond about 20 days. Further unexpected is the viscosity behavior exhibited by the slurry prepared with PA-control-6 beyond about 15 days which then had the lowest, most desirable T-bar viscosity of all three slurries. This PA-control-6 polymer was synthesized in the same manner as PA-control-5, using the CTA-2 chain transfer agent, but was chemically split in half This long-term, low viscosity performance of the PA-control-6 prepared slurry is additionally unexpected since its molecular weight is outside the range considered by those skilled in the art optimal for GCC grinding and dispersion. The other two polymers, PA-frac-2 and PA-control-5, are within this otherwise optimal range of Mw about 6,000 and would have been expected to provide superior slurry viscosities to PA-control-6.

Furthermore, there is a cost advantage to manufacturing a controlled molecular weight polymer with chain transfer agents such as CTA-2 and then splitting the polymer in half to approach an optimal molecular weight, since only half the amount of the expensive chain transfer agent is needed.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A mineral slurry comprising:
   mineral particles in an amount equal to or greater than about 60 percent by total weight of the slurry, wherein 85 percent of the mineral particles have an average particle size equal to or less than 2 micrometers;
   a polyelectrolyte dispersant having a polydispersity of at least 1.0 to less than 1.5 comprises a first acrylate polymer and a second acrylate polymer derived from the first acrylate polymer, wherein the first acrylate polymer is formed by reversible addition-fragmentation chain transfer polymerization and includes a trithiocarbonate group in the center of the first acrylate polymer and the second acrylate polymer comprises endgroups comprising thio-containing residues derived from the trithiocarbonate group and has a weight average molecular weight ($M_w$) about one half of the first acrylate polymer, wherein the polyelectrolyte dispersant is in an amount less than about 35 pounds of the dispersant per ton of dry mineral particles, and wherein the first acrylate polymer has a molecular weight average of 6,000 to 20,000 Daltons and the second acrylate polymer has a molecular weight of 3000 to 10,000 Daltons; and
   the remainder water.

2. The mineral slurry of claim 1, wherein the mineral particles are calcium carbonate.

3. The mineral slurry of claim 1, wherein the first acrylate polymer is a reaction product from a reaction of a trithiocarbonate chain transfer agent, a free radical initiator, and an acrylate monomer.

4. The mineral slurry of claim 3, wherein the acrylate monomer comprises acrylic acid.

5. The mineral slurry of claim 3, wherein the first acrylate polymer is a copolymer.

6. The mineral slurry of claim 1, wherein the polyelectrolyte dispersant further comprises a blend of polyelectrolytes derived from different acrylate polymers prepared by reversible addition-fragmentation chain transfer, wherein each of the acrylate polymers has a polydispersity less than 1.5.

7. The mineral slurry of claim 1, wherein the polydispersity is less than 1.3.

8. The mineral slurry of claim 1, wherein the mineral slurry has a viscosity less than 3,000 centipoise at standard temperature and pressure.

9. The mineral slurry of claim 1, wherein the mineral slurry has a 28 day static Brookfield T-bar viscosity of less than 7000 cP.

10. The mineral slurry of claim 1, wherein the first and second acrylate polymers define a bi-modal molecular weight distribution as determined by gel permeation chromatography.

11. The mineral slurry of claim 10, wherein the first acrylate polymer comprises a high molecular weight component and the second acrylate polymer comprises a low molecular weight component, wherein the high molecular weight component is present in an amount greater than 0 and less than 25 weight percent based on the total weight of the high and low molecular weight components, and the high and low molecular weight components each have a polydispersity from 1.0 to 1.5.

12. A process for preparing a mineral slurry, the process comprising:
    milling a mixture with a milling media to form the mineral slurry, the mixture comprising carbonate-containing particles in an amount of about 68 to about 80 weight percent based on the total weight of the mixture, a polyelectrolyte dispersant comprising a first acrylate polymer and a second acrylate polymer derived from the first acrylate polymer formed by reversible addition-fragmentation chain transfer polymerization and includes a trithiocarbonate group in the center of the first acrylate polymer and, the second acrylate polymer comprises endgroups comprising thio-containing residues derived from the trithiocarbonate group and has a weight average molecular weight ($M_w$) about one half of the first acrylate polymer, wherein the first acrylate polymer has a molecular weight average of 6,000 to 20,000 Daltons, and wherein the polyelectrolyte dispersant has a polydispersity of less than 1.5 and is in an amount of less than about 35 pounds of the polyelectrolyte dispersant per ton of dry weight of carbonate-containing particles, and a remainder being water; and
    filtering the media from the mineral slurry; wherein 90 percent of the carbonate containing particles in the mineral slurry have an average particle size of less than 2 micrometers.

13. The process of claim 12, wherein the first acrylate polymer is formed by reacting a trithiocarbonate chain transfer agent, a free radical initiator, and an acrylate monomer.

14. The process of claim 13, wherein the acrylate monomer is an acrylic acid.

15. The process of claim 12, wherein the carbonate containing particles are calcium carbonate.

16. The process of claim 12, wherein the polyelectrolyte dispersant further comprises a blend of polyelectrolytes derived from different acrylate polymers prepared by reversible addition-fragmentation chain transfer, wherein each of the acrylate polymers has a polydispersity less than 1.5.

17. The process of claim 12, wherein the polyelectrolyte dispersant has a bi-modal molecular weight distribution as determined by gel permeation chromatography.

18. The process of claim 12, wherein the mineral slurry has a 28 day static Brookfield T-bar viscosity of less than 7000 cP.

19. The process of claim 12, wherein the first acrylate polymer is present in an amount greater than 0 and less than 25 weight percent based on the total weight of the first and second acrylate polymers.

* * * * *